United States Patent

[11] 3,581,642

[72] Inventors Katsuhiko Nomura;
Tadazumi Sakazaki, Toyko-to, both of, Japan
[21] Appl. No. 778,530
[22] Filed Nov. 25, 1968
[45] Patented June 1, 1971
[73] Assignee Asahi Kogaku Kogyo Kabushiki Kaisha Tokyo-to, Japan
[32] Priority Feb. 15, 1968
[33] Japan
[31] 9,565

[54] THROUGH-THE-LENS LIGHT MEASURING SYSTEM
8 Claims, 6 Drawing Figs.

[52] U.S. Cl. ................................................. 95/42, 95/10
[51] Int. Cl. ......................................................... G03b 19/12
[50] Field of Search ........................................... 95/42, 64 B, 10 C

[56] References Cited
UNITED STATES PATENTS
3,470,806 10/1969 Uno............................. 95/42

Primary Examiner—Samuel S. Matthews
Assistant Examiner—Richard L. Moses
Attorney—Stanley Wolder ABSTRACT: A through-the-lens measuring system in a single lens reflex camera includes through-the-lens open lens through-the-lens far fully open and reduced apertures light measuring networks, a battery and a pair of double-throw switches, each resiliently closed to one contact thereof. One switch has its contacts interconnected and is connected between the battery and the networks and the contacts of the other switch are connected to respective network terminals so as to alternatively actuate the networks. A self timer includes a winding shaft and a winding member connected thereto by a lost motion coupling. A switch actuating lever is operated by the winding member in the lost motion movement to alternatively close selected contacts of each switch and thereby energize and actuate a selected network.

Patented June 1, 1971 3,581,642

INVENTORS
KATSUHIKO NOMURA
TADAZUMI SAKAZAKI
BY Stanley Wolder
ATTORNEY

Patented June 1, 1971
3,581,642
2 Sheets-Sheet 2
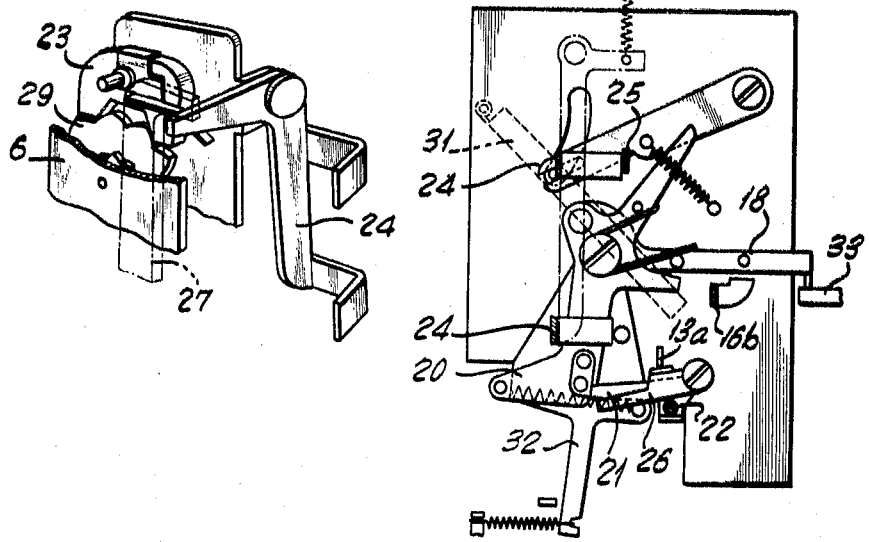
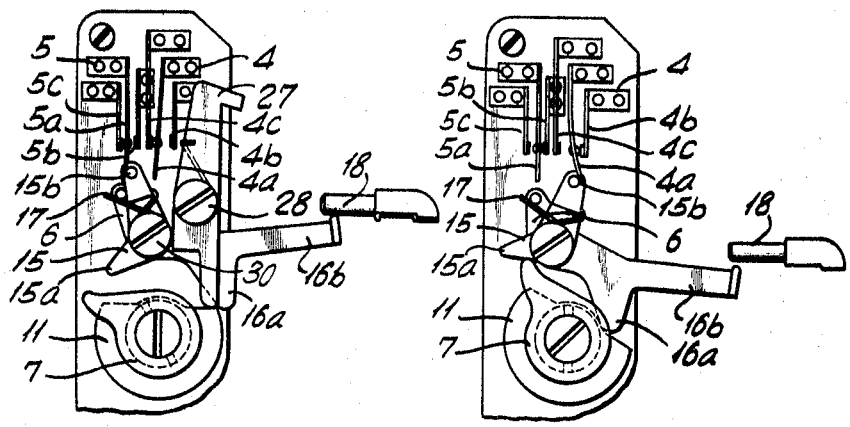
INVENTORS
KATSUHIKO NOMURA
TADAZUMI SAKAZAKI
BY Stanley Wolder
ATTORNEY

THROUGH-THE-LENS LIGHT MEASURING SYSTEM

BACKGROUND OF THE INVENTION

The present invention relates generally to improvements in light measuring systems and it relates particularly to an improved through-the-lens light measuring system for single lens reflex cameras.

In single lens reflex cameras, such operations as viewing the object and focusing the camera in preparation for a shot have usually been carried out through the fully opened lens in order to produce a bright viewed image whereby said operations may be more efficient.

On the other hand, with a photometric or light measuring system of the so-called through-the-lens (TTL) type wherein a photoelectric element is arranged within the path of light coming through the objective lens from an object so as to achieve the desired exposure measurement, an arrangement has been proposed adapted for said single lens reflex camera during use, such that a resistance value of a variable resistance included in a photometric circuit may be adjusted in response to the rotation angle of the adjusting ring for the diaphragm preset stop values whereby requirements for stop value adjustments may be effectively added to an operation indicating an exposure value adjusted according to a result of photometering. With such a photometric mechanism, therefore, it is possible that the operation of an exposure meter involving the requirements for stop value at the moment of exposure is effectuated during said operations preparatory for an actual shot through the opened up lens. If the diaphragm mechanism is stopped down to an extent of the actually adjusted value during said operations in order to ascertain the depth of focus or in order to achieve an efficient use of any of replaceable lens without an automatic diaphragm mechanism, the light intensity from the object is necessarily limited to some extent due to the stopping down of the lens. Addition of any electrical requirements for stop value adjustment in association with said adjusting ring for the preset stop values in this situation would result in a double inclusion of the requirements for an adjusted stop value to the operation indicating an exposure value, so that it would be impossible for the user to obtain a proper exposure. With such a photometric system, therefore, it is desirable that a part of the operative circuit included in the photometric mechanism is effectively changed over depending on whether TTL fully open or reduced aperture light measurement is to be effected whereby it is always possible to achieve a proper exposure adjustment.

SUMMARY OF THE INVENTION

It is a principal object of the present invention to provide an improved light measuring system.

Another object of the present invention is to provide an improved through-the-lens light measuring system in a single lens reflex camera.

Still another object of the present invention is to provide an improved through-the-lens light measuring system wherein light measurement may be properly accomplished with a fully open or a stopped down objective lens aperture.

A further object of the present invention is to provide in a camera an improved TTL open and reduced aperture light measuring networks which are selectively actuated by the camera self-timer winding element.

Still a further object of the present invention is to provide a mechanism of the above nature characterized by its simplicity, reliability, versatility, adaptability and convenience and ease of operation.

The above and other objects of the present invention will become apparent from a reading of the following description taken in conjunction with the accompanying drawings which illustrate a preferred embodiment thereof.

In a sense the present invention contemplates the provision in a single lens reflex camera of a through-the-lens light measuring system comprising an open lens first light measuring network including energizing and actuating terminals, a stopped down lens second light measuring network including energizing and actuating terminals, a battery, a first switch means connected between said network energizing terminals and said battery, a second switch means connected to said network actuating terminals for alternatively actuating said networks, and switch actuating means normally maintaining the said first switch means in a network deenergizing condition and for actuating said second switching means to selectively actuate one of said networks and concurrently actuate said first switching means to a network energizing condition. Another feature of the present invention resides in the provision in a single lens reflex camera of a through-the-lens light measuring system comprising an open lens first light measuring network, a stopped down lens second light measuring network, a self timing device including a winding shaft, a winding member, a rotatable lost motion coupling between said winding member and said winding shaft permitting the free limited rotation of said winding member in opposite directions, and means responsive to the rotation of said winding member for alternatively actuating said networks.

The improved light measuring system is simple, reliable and convenient to use and assures the proper correlation of the exposure parameters under the different conditions of light measurement.

BRIEF DESCRIPTION OF THE DRAWINGS

FIG. 3 is a fragmentary perspective view of the self-timer governor mechanism;

FIG. 4 is an elevational view of the mirror device mechanism;

FIG. 5 is a view similar to FIG. 1, the mechanism being illustrated in a TTL reduced aperture light measuring condition; and FIG. 6 is a view similar to FIG. 5, the mechanism being illustrated in a TTL open aperture light measuring condition.

DESCRIPTION OF THE PREFERRED EMBODIMENT

Figure 1:
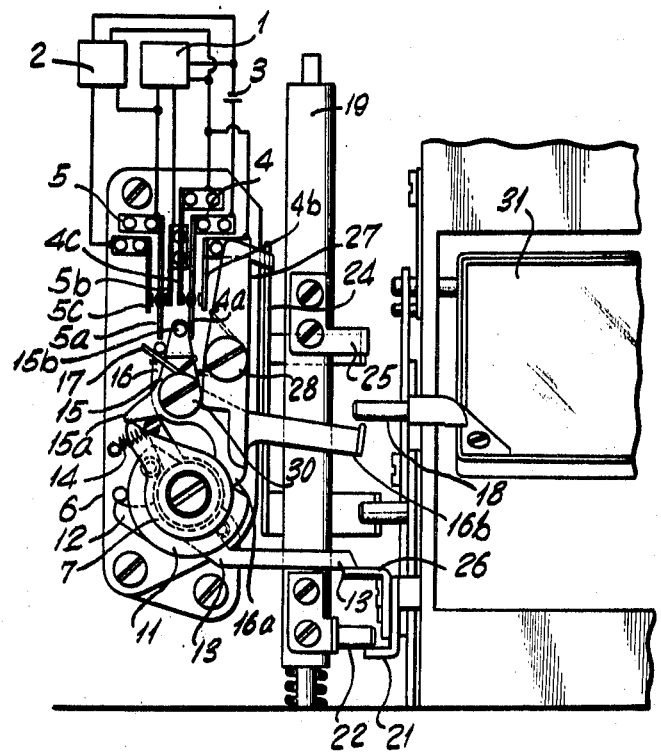
FIG. 1 is a fragmentary front elevational view of a mechanism embodying the present invention shown associated with a single lens reflex camera.
Figure 2:
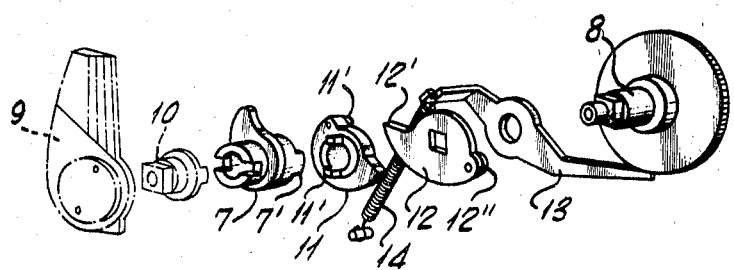
FIG. 2 is an exploded perspective view of the circuit selector mechanism and the associated self-timing winder.

Referring now to the drawings which illustrate a preferred embodiment of the present invention, as shown in FIGS. 1, 5 and 6 a through-the-opened-up-lens photometric circuit or light measuring network 1 of known construction in a photometric system of so-called through-the-lens type comprises a group of resistances of which the values are adjustable according to exposure parameters such as stop value or lens aperture, exposure time, and speed rating, and is adapted to constitute a light measuring system which provides an indication responsive to the adjusted value of said group of resistances as compared to the resistance of a photoconductive cell exposed to the camera incident light. A TTL reduced aperture photometric circuit 2 is similar to circuit 1 but lacks the resistances included in said group of resistances in said through-the-opened-up-lens photometric circuit 1 which are adjustable according to the lens stop values. A source battery 3 is provided for energizing circuits or networks 1 and 2 and a switch 4 is connected in series between network 1 and 2 and battery 3. Switch 4 includes a movable resilient switch arm 4a adapted to be maintained in neutral position as will be hereinafter described and a pair of opposing contact elements 4b and 4c on opposite sides of switch arm 4a and in the path thereof. Switch arm 4a is connected to one pole of battery 3 and contact terminals 4b and 4c are interconnected and connected to the energizing terminals of networks 1 and 2. A changeover switch 5 is mounted on a base plate 6 together with switch 4 side by side so as to effectuate changeover between said photometric circuits 1 and 2. A movable terminal or resilient switch arm 5a of switch 5 is normally in contact with a contact element 5b and thereby actuates and maintains the photometric circuit 1 operative and is movable into contact with another opposite contact element 5c permitting the other photometric circuit 2 to become operative. A lever 7, as best seen in FIG. 2, is mounted on an end of a self-timer charge shaft 8 in such a manner that said lever may be rotated with said shaft 8 through a charge lever 9 and a connecting member 10 provided on the outer casing of the camera. A rotatable axis supporting lever 7 has its lower end cut off to leave a peripheral section 7', portion 7' being confronted by a projection 11' on upper end of a relay ring 11 mounted on charge shaft 8. There is provided lost motion or play for limited free rotation until projection 11' comes into engagement with portion 7', and therefore relay ring 11 is kept free from engagement with said lever 7 within an initial rotation range of lever 7 or charge lever 9. A lever 12 mounted on and rotatable with charge shaft 8 is provided with an engaging step portion 12' which projects into the rotation path of a pin 11" carried by relay ring 11 and with a pin 12" opposite to engaging step portion 12'. A release starting lever 13 is supported by charge shaft 8 so as to be rotatably driven by pin 12" of said lever 12 against the action of a spring 14 suspended between one end of said release starting lever 13 and an immobile portion of camera body. Two levers 15 and 16 are pivoted to a fixed axis 30 and are engaged by a spring 17 to urge corresponding ends of these levers to rotate to overlap one another. An arm 15a of lever 15 is kept abutted against the active end of lever 7 while another arm 15b thereof is positioned between switch arms 4a and 4b. Switch arm 4a is spring-loaded so as to abut the contact terminal 4c and is normally held in a neutral position between contact terminals 4b and 4c by engaged lever arm 15b. Meanwhile an arm 16a of lever 16 is kept abutted against a notched cam surface of relay ring 11. Thus the lever arms 15a and 16a are kept abutted against the lever 7 and the relay ring 11, respectively, and particularly, lever arm 15b is adapted for making switch arms 4a and 5a occupy their respective neutral positions. A stopping down operation lever 18 is incorporated in the automatic diaphragm mechanism and is adjacent to the rotation range of other lever arm 16b of lever 16 so that, as lever 16 is rotatably urged by the notched cam surface of relay ring 11, stopping down lever 18 may be actuated by lever arm 16b acting on lever 18. A shutter rod 19 is provided at its lower end with a pin 22 adapted to abut a locking lever 21 which may hold a lever 20 for driving a reflecting mirror upward in a position where said lever 20 has a driving potential and thereby to cause locking lever 21 to retreat from the locking range. Shutter rod 19 is further provided at its intermediate portion with a locking piece 25 adapted to normally hold a lever 24 which may lock a pawl 23, (FIG. 3) of a self-timer governor mechanism in a position where lever 24 locks said pawl 23 with pressure. There is provided another locking piece 26 (FIGS. 1 and 4) pivoted coaxially with locking lever 21, locking piece 26 being adapted to be urged by the arm 13a of the lever 13 and thereby retreat from the range where said piece 26 may effect its locking operation. A lever 27 is pivoted to a fixed axis 28 in such a manner that its one end is located adjacent to the notched cam surface of relay ring 11 and its other end provides a resilient force by which lever 24 is normally suspended. Referring to FIG. 3, a self-timer governor mechanism including an escape wheel 29 and pawl 23 is mounted on rear side of the base plate 6 of which the opposite side is provided with switches 4 and 5. As seen in FIG. 4, a reflecting mirror 31 is adapted to be driven as well as controlled by a well-known quick return mirror mechanism including a force storing lever 32, upward driving lever 20 and other intermediate levers. A connecting member 33 adapted to act on the pin that drives the diaphragm for the objective into stopped down position is kept abutted against stopping down lever 18.

Employing the mechanism described above, before photometering operation is started, levers 15 and 16 being abutted against the active section of the lever 7 included in the self-timer charge mechanism and the notched cam surface of the relay ring 11, respectively, normally occupy the neutral positions (as indicated in FIG. 1 by solid line). In these positions, lever arm 15b abuts switch arm 4a whereby lever arm 15b keeps switch 4a spaced from both contact terminals 4c and 4b against the resiliency of switch arm 4a, and positioned free from the path where lever arm 15b may act on the switch arm 5a so that the resiliency of switch arm 5a keeps arm 5a and the contact terminal 5b in mutual engagement. In such a condition, therefore, the switch 4 is opened whereby the photometering mechanism is free from being energized, while said changeover switch 5 is so closed whereby the TTL open aperture photometric circuit 1 may be readily operated.

When the TTL reduced aperture photometering operation is intended, the user may turn the charge lever 9 included in the self-timer charge mechanism clockwise, as viewed in FIG. 2, with the diaphragm mechanism being kept opened up, that is, under the normal condition in preparation for a shot. The turning of the charge lever 9, in turn, drives the lever 7 clockwise as in FIG. 1 through said lever 9 and the connecting member 10, lever 7 being fixed to lever 9. Then lever 15 adjacent to the active end of said lever 7 is urged clockwise, as in FIG. 1, against a force of the spring 17. Consequently, lever arm 15b urges switch arm 4a rightward, as in FIG. 1, into contact with the contact terminal 4b (See FIG. 6). Thus, the photometric mechanism is energized from the source battery 3 and thereby the through-the-opened-up-lens photometric circuit 1 which has been switch-closed so as to be ready for operation becomes energized and operative. As a result, the adjustment condition of exposure can be ascertained through an operation of the exposure meter by which a comparison is effectively performed between a value of the group resistances previously adjusted according to the film speed rating, a value of stop or a value of exposure time and the value of the resistance of the photoconductive element adapted to receive the light traversing the objective from an object, under the stop value adjusted as that for the through-the-opened-up-lens photometric operation.

On the other hand, when the TTL reduced aperture photometering operation is intended, for example, in preparation for a shot with confirmation of depth of focus or with a substituted lens having no automatic diaphragm mechanism, the user may somewhat turn the charge lever 9 in the direction of charge (i.e., counterclockwise, as in FIG. 2). In the TTL open aperture photometering operation where the charge lever 9 is turned in the direction of countercharge, a play present in the area where the lever 7 is connected with the relay ring 11 (i.e., the area between a portion 7' of lower periphery of the lever 7 and a projection 11' of the upper end of the relay ring 11) maintains said relay ring 11 from being driven. Turning said lever 9 in the direction of charge makes said projection 11' of the relay ring 11 abut portion 7' of the lever 7 and thereby drives relay ring 11 integrally with lever 7. As to the self-timer charge mechanism, the charge shaft 8 is held from being driven until the pin 11" of said relay ring 11 abuts the engaging step portion 12' of the lever 12. During the period when charge shaft 8 is being held from being driven, therefore, operation of the charge lever 9 turns the lever 7 and the relay ring 11 counterclockwise as viewed in FIG. 1 and their active end and notched cam surface, in turn, urge the lever 15 together with the lever 16 counterclockwise as viewed in FIG. 1. The lever arm 15b is separated from the switch arm 4a with which said lever arm has been previously in contact, and urges the movable terminal 5a leftward as seen in FIG. 1 against the resiliency thereof. As a result, switch arm 4a becomes in contact with, due to the resiliency thereof, the contact terminal 4c and thereby an energy feed circuit to the photometric mechanism is effectively closed, while the other switch arm 5a comes into contact with the other contact terminal 5c and the through-the-stopped-down-lens photometric circuit 2 becomes operative. As lever 16 is turned, the arm 16b thereof is moved upward as in FIG. 1 and thereby abuts the stopping down lever 18, so that the automatic diaphragm mechanism of the lens frame is stopped down as illustrated in FIG. 5. Accordingly, the photometric mechanism wherein the changeover to the TTL reduced aperture photometric circuit 2 has taken place indicates an adjustment condition of exposure through the operation of the exposure meter on the basis of variation in resistance of the photoconductive element adapted to receive the light traversing the objective from an object, said light being limited by the stopped down diaphragm mechanism, without adding the requirements for adjustment of stop value to the photometric operation through an electric adjustment. The photometric mechanism is thus free from double inclusion of the adjustment of stop value, and the indicating operation as described above is performed under the proper conditions for stop value, by TTL photometric measurement with the diaphragm stopped down.

Operation of the self-timer charge is effectuated by a further turning the charge lever 9 following that during the through-the-stopped-down-lens photometric operation. As lever 9 is turned counterclockwise as in FIG. 2, the charge shaft 8 is not driven, as previously described, within the initial turning operation and will be driven upon engagement of the pin 11" of the relay ring 11 with the engaging step portion 12' of the lever 12 and subsequent rotation of lever 12 which are brought about by a further rotation of said relay ring 11. As the charge shaft 8 is thus driven, the self-timer mechanism is charged and the shutter rod 19 is depressed. As a result, the lever 24 that has been released from the lever 27 has one end forcibly turned by the notched cam surface of the relay ring 11 as said relay ring 11 is turned during the timer charging, and is released from the locking piece 25 and thereby starts the governor mechanism so that the pin 12" of lever 12 which has turned back to its original position may urge the release starting lever 13 counterclockwise as in FIG. 2 against an effect of the spring 14 and thereby release the locking piece 26 from the range of its locking effect on said starting lever 13 so as to start the release operation.

According to the present invention, as is clear from the foregoing description, a source switch having parallel connected sections is inserted in series into a feed or energizing circuit of a photometric system of a single lens reflex camera having a TTL photometering system, said photometric system including the TTL reduced aperture photometric circuit section and the TTL reduced aperture photometric circuit section, so that said source switch may be normally held in a neutral or open condition while said through-the-opened-up-lens photometric circuit section and through-the-stopped-down-lens photometric circuit section may be selectively operated by a changeover switch adapted to be actuated in association with circuit closing operation of said source switch. As the two switches are adapted to interlock to each other, the TTL open aperture photometric operation and the TTL reduced aperture photometric operation may be selectively changed over by a single operation of both switches. The source battery can be prevented from being wasted when the photometric mechanism is not in use because the source switch is normally kept in the open position. Further according to this invention, the self-timer charge lever may have a play within the range of its positive or negative initial rotation until said lever starts the charge operation and said single operation of the both switches may be effectuated by the operation of said lever within the range of its positive or negative initial rotation. For the changeover between the TTL open aperture photometric operation and the TTL reduced aperture photometric operation, therefore, no special operating member is required. The means according to this invention is very efficient for practical use still further in that said changeover may be quickly and surely achieved with a simple mechanism.

While there has been described and illustrated a preferred embodiment of the present invention, it is apparent that numerous alterations, omissions and additions may be made without departing from the spirit thereof.

We claim:

1. In a single lens reflex camera, a through-the-lens light measuring system comprising an open lens first light measuring network including energizing and actuating terminals, a stopped down lens second light measuring network including energizing and actuating terminals, a battery, a first switch means connected between said network energizing terminals and said battery and comprising a double-throw switch connected between said battery and said network energizing terminals and including opposing interconnected first contacts and a first switch arm positioned between said first contacts and resiliently urged toward engagement with one of said first contacts, a second switch means connected to said network actuating terminals for alternatively actuating said networks, and switch actuating means normally maintaining said first switch means in a network deenergizing condition and for actuating said second switching means to selectively actuate one of said networks and concurrently actuate said first switching means to a circuit energizing condition, said switch actuating means including an actuating element normally urging said first switch arm to a position between and out of engagement with said first contacts and alternatively swingable in opposite directions to effect engagement between said switch arm and alternative of said contacts.

2. In a single lens reflex camera, a through-the-lens light measuring system comprising an open lens first light measuring network including energizing and actuating terminals, a stopped down lens second light measuring network including energizing and actuating terminals, a battery, a first switch means connected between said network energizing terminals and said battery, a second switch means connected to said network actuating terminals for alternatively actuating said networks and comprising a double-throw switch including opposing second contacts and a second switch arm between said second contacts and resiliently urged into engagement with one of said second contacts, said second arm and one of each of said second contacts being connected between respective actuating terminals of said networks, and switch actuating means normally maintaining said first switch means in a network deenergizing condition and for actuating said second switching means to selectively actuate one of said networks and concurrently actuate said first switching means to a circuit energizing condition, said switch actuating means including an actuating element moveable alternatively to urge said second switch arm into engagement with one of said second contacts and to release said second arm into engagement with the other of said second contacts.

3. In a single lens reflex camera, a through-the-lens light measuring system comprising an open lens first light measuring network including energizing and actuating terminals, a stopped down lens second light measuring network including energizing and actuating terminals, a battery, a first switch means connected between said network energizing terminals and said battery and comprising a double-throw switch connected between said battery and said network energizing terminals and including opposing interconnected first contacts and a first switch arm positioned between said first contacts and resiliently urged toward engagement with one of said contacts, a second switch means connected to said network actuating terminals for alternatively actuating said networks and comprising double-throw switch including opposing second contacts and a second switch arm between said second contacts and resiliently urged into engagement with one of said second contacts, said second arm and one of each of said second contacts being connected between respective actuating terminals of said networks, and switch actuating means normally maintaining said first switch means in a network deenergizing condition and for actuating said second switching means to selectively actuate one of said networks and concurrently actuate said first switching means to a circuit energizing condition, said switch actuating means including an actuating element normally urging said first switch arm to a position between and out of engagement with said first contacts and alternatively swingable in opposite directions to effect engagement between said switch arm and alternative of said contacts and moveable away from said first switch arm to engage and urge said second switch arm in a direction opposite the resilient urging thereof out of engagement with said second contact normally engaged thereby into engagement with the other of said second contacts.

4. The system of claim 3 comprising a self-timer including a rotatable winding shaft, a winding element, a rotatable lost motion coupling device connecting said winding element to said shaft and permitting free limited rotation thereof in opposite directions relative to said shaft, a means coupling said winding element to said actuating element for moving said actuating element in opposite directions with the movement of said winding element.

5. The system of claim 4 wherein said actuating element comprises a lever including a first arm swingable in a path extending between alternative engagement of said switching arms and a second arm engageable by said winding element coupling means.

6. The system of claim 3 including a diaphragm control element and means coupling said actuating element to said diaphragm control element.

7. In a single lens reflex camera, a through-the-lens light measuring system comprising an open lens first light measuring network, a stopped down lens second light measuring network, a self-timing device including a winding shaft, a winding member, a rotatable lost motion coupling between said winding member and said winding shaft permitting the free limited rotation of said winding member in opposite directions, and means responsive to the opposite rotations of said winding member for alternatively actuating said networks.

8. The system of claim 7 comprising a battery, said actuating means including a first switch connected between said networks and said battery, a second switch alternatively closing said first and second networks, and a switch actuating lever operable with said winding member for concurrently closing said first switch and controlling said second switch to close a selected of said networks.